No. 819,649. PATENTED MAY 1, 1906.
J. T. HAM.
CHURN OPERATOR.
APPLICATION FILED APR. 13, 1905.
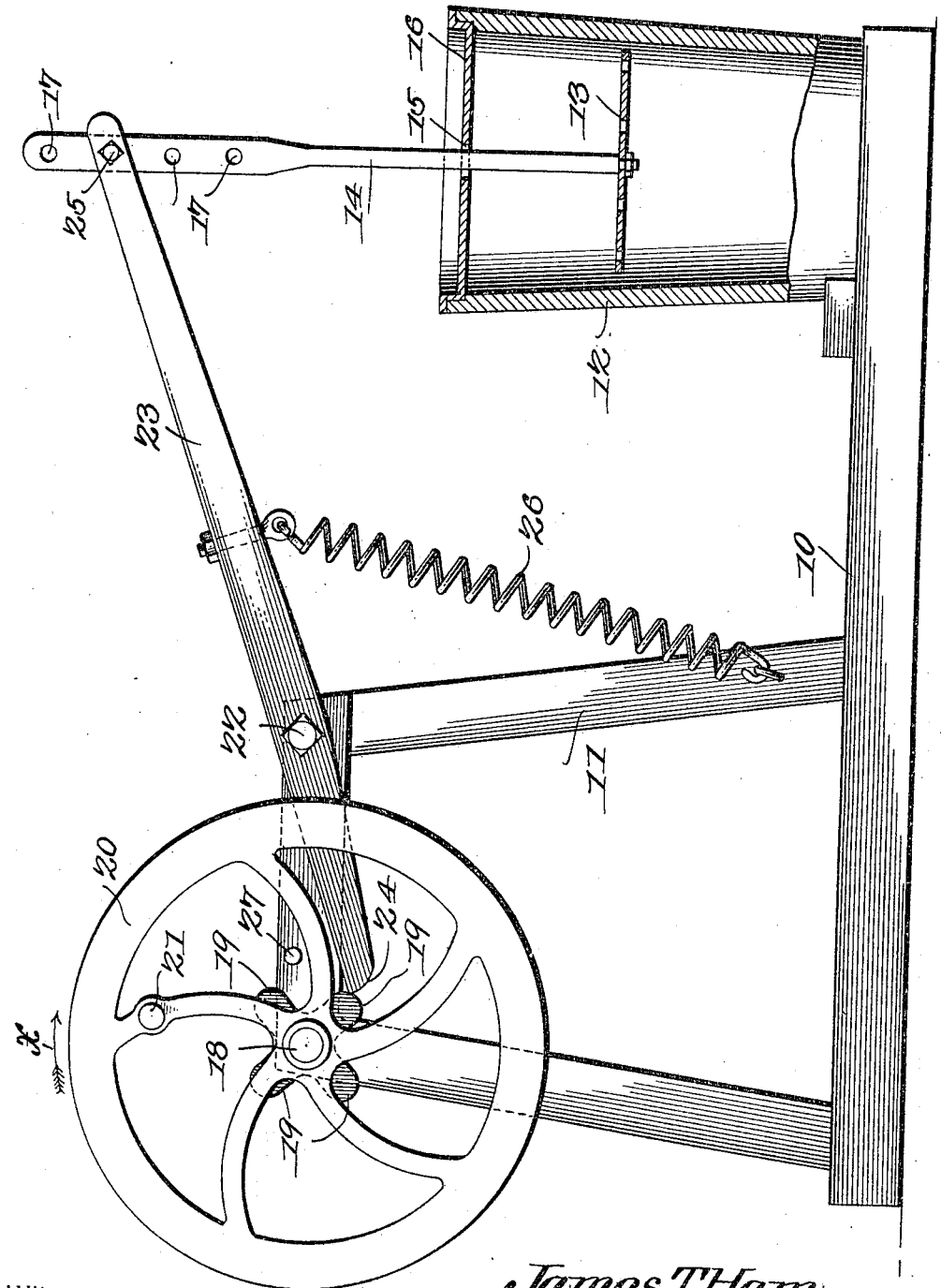
Witnesses
James T. Ham, Inventor.
by Attorneys

UNITED STATES PATENT OFFICE.

JAMES T. HAM, OF MINERAL WELLS, TEXAS.

CHURN-OPERATOR.

No. 819,649. Specification of Letters Patent. Patented May 1, 1906.

Application filed April 13, 1905. Serial No. 255,424.

*To all whom it may concern:*

Be it known that I, JAMES T. HAM, a citizen of the United States, residing at Mineral Wells, in the county of Palo Pinot and State of Texas, have invented a new and useful Churn-Operator, of which the following is a specification.

This invention relates to devices for operating churn-dashers, and has for its object to improve the construction and increase the efficiency and utility of devices of this character.

With these and other objects in view, which will appear as the nature of the invention is better understood, the same consists in certain novel features of construction, as hereinafter fully described and claimed.

In the accompanying drawing, forming a part of this specification, and in which corresponding parts are denoted by like designating characters, is illustrated the preferred form of embodiment of the invention capable of carrying the same into practical operation.

In the drawing thus employed the figure represents a side elevation, partly in section, of the improved device.

In operating churns having vertically-reciprocating dashers the downward motion displaces the cream or milk and forces it first to the sides of the receptacle, and the milk then rolls over toward the center of the receptacle and is met by the dasher at the upstroke and again thrown outward and then again returns to the center of the receptacle in position to be again moved outward at the next downstroke of the dasher, and so on as long as required.

In the churning action the downstrokes are the most effective, as the greatest resistance is encountered during the downstroke, owing to the mass of the milk being beneath the dasher and the resistance thereto constantly increasing as the dasher moves downwardly.

To effectually separate the butter particles under the action of a vertically-reciprocating dasher therefor requires a rapid downstroke, while the upstroke should be relatively slower to avoid splashing and because the resistance is less and grows constantly less as the dasher approaches the top of the mass of milk or cream. To produce this rapid downstroke and the relatively slower upstroke to the dasher is the principal object of the present invention, and the mechanism employed to produce the required results consists of a base or platform 10, having a standard-frame 11 rising therefrom and with the milk receptacle or churn-body 12 supported thereon.

The churn-body may be of any desired form or size and is provided with a dasher 13, having a rod 14 extending therefrom through an aperture 15 in the closure 16, and with a plurality of spaced apertures 17 at the upper end.

A shaft 18 is journaled for rotation upon the standard 11 and provided with a plurality of radiating cam-arms 19 and preferably with a fly-wheel 20, to which the operating-handle 21 is connected.

The ends of the cam-arms 19 are rounded and are adapted to successively contact with one end of a lever 23, which is fulcrumed at a point between its ends upon the frame 11 and is provided at one end with a bolt 25 for engaging any one of the apertures 17 in the dasher-rod 14. That end of the lever which is contacted by the cam-arms has its face rounded, as shown at 24, so that the end of the lever will quickly escape the cam-arms as soon as depressed thereby and said end will have a free uninterrupted upward movement until contacted by the next succeeding cam-arm.

A spring 26 is adjustably connected at one end to the lever 23 between the pivot 22 and the dasher-rod 14 and at the other end to the standard-frame 11, and thus exerts its force to suddenly move the dasher downwardly when the lever is released. By this arrangement it will be obvious that when the shaft 18 is rotated in the direction of the arrow the cam-arms 19, acting on the end 24 of the lever, depress the same and correspondingly elevate the dasher, and as the cam-arms consecutively pass the lever end the spring 26 will suddenly return the lever to its former position, carrying the dasher with it, the downward movement being limited by the stop 27.

A reciprocating movement is thus imparted to the dasher within the receptacle 12 with the downstrokes rapid under the influence of the spring 26 and the upstrokes relatively slow under the influence of the cam members 19, the speed of the slower upstrokes being easily controlled by the speed with which the shaft 18 is rotated and the number of "actions" to each revolution of the shaft being also controlled by the number of cam-arms upon the shaft.

As many of the cam-arms may be employed as required; but generally four will be sufficient, as shown.

It will also be noted that as the dasher 13 is suddenly depressed it comes in contact with the milk or cream in the body 12 and is thus "cushioned" or retarded, so that it does not produce a jar or "hammer-blow" upon the stop 27, but approaches the latter slowly and without producing an unpleasant jar thereon. The milk or cream in the body thus produces a retarding action on the lever and materially improves the action.

The device is simple in construction, efficient in action, and can be readily adjusted to the quantity of milk in the receptacle by adjusting the pin 25 in the apertures 17.

Importance is attached to the fact that the arms 19 extend straight from the shaft 18 and have their ends rounded, because as a result of this construction each arm throws the end of the lever 23 quickly downward with little friction, because the sliding motion of the arm upon the lever is reduced to the minimum in view of the fact that the end of the arm is rounded and does not extend under the power-shaft and also as a result of this construction a very small percentage of the surface of the arm contacts with the lever. By rounding the lower surface of the ends of the lever, as shown at 24, said lever will quickly escape and swing above the arms, whereas if the end of the lever was square this swinging action would be interrupted.

By adjustably connecting the spring 26 to the lever 23, as shown in the drawing, the tension of the spring would be regulated, so as to increase or diminish the speed of the downward stroke of the dasher.

Having thus described the invention, what is claimed is—

The combination with a churn-body having a dasher therein; of a supporting-frame, a drive-shaft rotatably mounted on the frame, straight arms radiating from the shaft and having rounded ends, a lever fulcrumed between its ends upon the supporting-frame and between the drive-shaft and the dasher, said lever being adjustably connected at one end to the dasher, the other end of the lever projecting into the path of the arms but not past the drive-shaft and having the lower surface of said end rounded, said arms adapted to successively contact with the lever to raise the dasher, and a spring secured at one end to the supporting-frame and adjustably connected at its other end to the lever at a point between the fulcrum thereof and its connection with the dasher, said spring adapted to propel the dasher against the contents of the churn-body, and a stop upon the supporting-frame for limiting the movement of the lever when propelled by the spring.

In testimony that I claim the foregoing as my own I have hereto affixed my signature in the presence of two witnesses.

JAMES T. HAM.

Witnesses:
H. M. COLEMAN,
C. M. HARRIS.